H. SAURER.
PANTOGRAPH FOR AUTOMATIC EMBROIDERING MACHINES.
APPLICATION FILED JUNE 19, 1911.

1,059,075.

Patented Apr. 15, 1913.

2 SHEETS—SHEET 1.

Witnesses:

Inventor:

H. SAURER.
PANTOGRAPH FOR AUTOMATIC EMBROIDERING MACHINES.
APPLICATION FILED JUNE 19, 1911.

1,059,075.

Patented Apr. 15, 1913.
2 SHEETS—SHEET 2.

Witnesses:

Inventor:
Hippolyt Saurer

UNITED STATES PATENT OFFICE.

HIPPOLYT SAURER, OF ARBON, SWITZERLAND.

PANTOGRAPH FOR AUTOMATIC EMBROIDERING-MACHINES.

1,059,075.  Specification of Letters Patent.  Patented Apr. 15, 1913.

Application filed June 19, 1911. Serial No. 633,963.

*To all whom it may concern:*

Be it known that I, HIPPOLYT SAURER, a citizen of the Republic of Switzerland, residing at Arbon, Switzerland, have invented new and useful Improvements in Pantographs for Automatic Embroidering-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to pantographs for automatic embroidering machines.

According to this invention two points of the pantograph are movable on straight guides, which are immovably arranged at an angle to each other to form two components, while at a third point the resultant of the two components is to be obtained.

Figure 1:
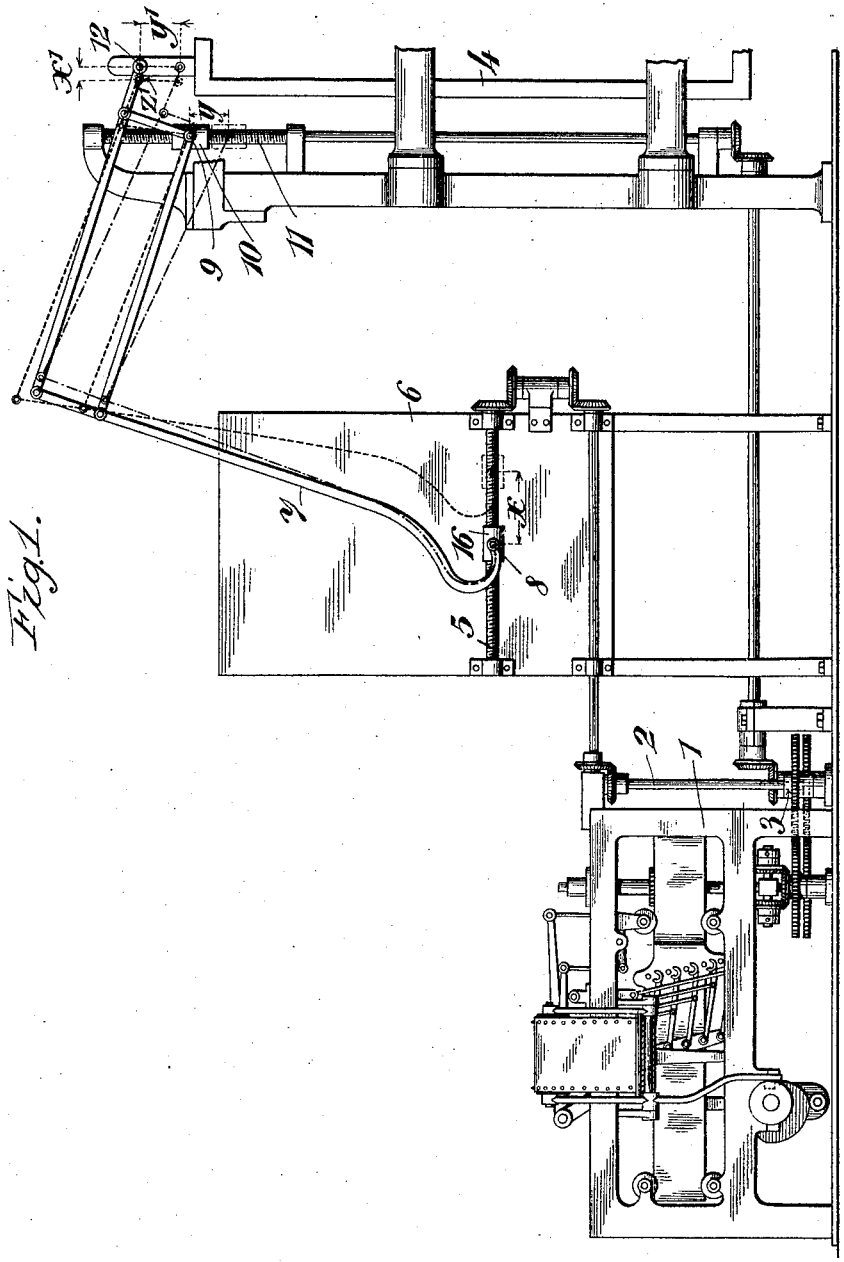
Figure 2:
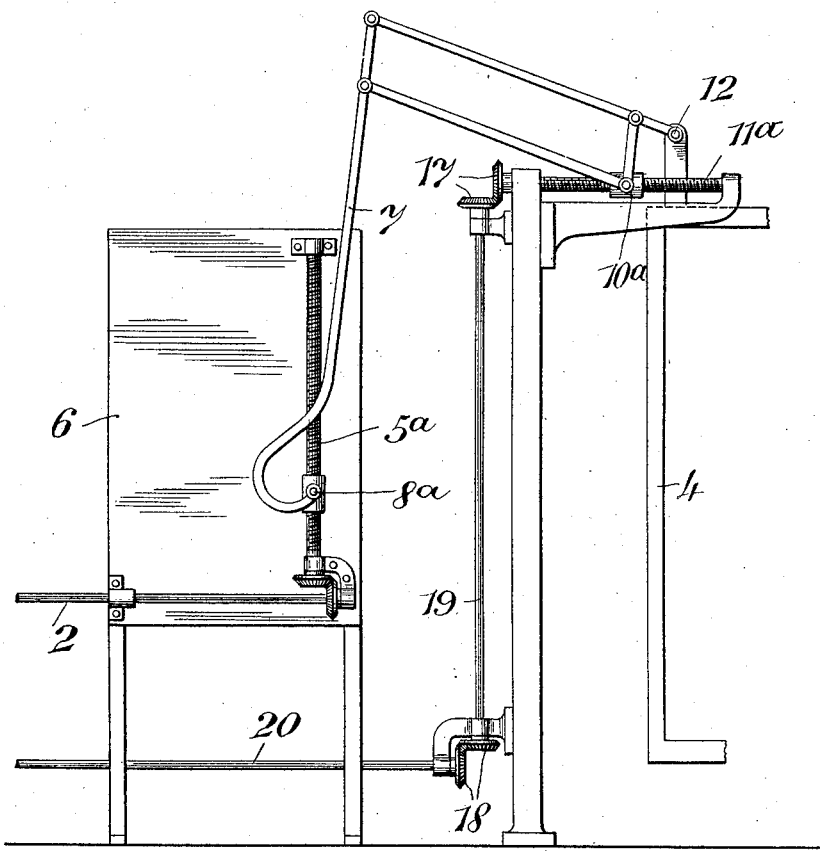

In the drawings, in which like parts are similarly designated—Figure 1 shows in elevation an embroidering machine to which the pantograph embodying my invention is connected; Fig. 2 is a like view of a modification.

1 is the frame of the automatic embroidering machine. The two shafts 2 and 3, are moved to correspond to the vertical and horizontal components required for the stitches, and said movements are combined to produce a resultant movement of the frame 4. The shaft 2 is connected to a horizontal spindle 5 by means of bevel gears. The spindle is rotatably supported by the pattern board 6, but immovable in vertical direction. A nut 16 is mounted on the spindle 5 and secured against rotation. The nut carries a pin 8 for the pantograph, around which the arm 7 of the pantograph is free to turn. This point of the pantograph is movable thereby in a fixed straight horizontal course. The joint 9 of the pantograph is rotatably connected to a nut 10, which is mounted on a vertical spindle 11 and prevented from rotating by suitable means. This spindle is connected by bevel gears to the shaft 3 of the embroidering machine. The point 9 is to be moved in a fixed, straight, vertical course. The frame 4 is supported by the joint 12 of the pantograph. If a horizontal component $x$ is imparted from the shaft 2 to the nut 16 by the jacquard apparatus 1, the frame is moved horizontally as much as $x^1$, as to be seen by the position of the pantograph shown in dash lines. If a vertical component $y$ is imparted from the shaft 3 to the nut 10, the frame is moved vertically as much as $y^1$, as to be seen by the position of the pantograph drawn in dot and dash line. If the two points 8 and 9, forming the components $x$ and $y$ respectively, are moved simultaneously the resultant $z^1$ of $x^1$ and $y^1$ is applied at the point 12. To the frame is imparted a motion equal to the resultant and of the same direction. The ratio $x:x^1$ is constant for all values of $x$ and also the ratio $y:y^1$ is constant for all values of $y$. By choosing a suitable ratio at the jacquard apparatus or of the bevel gears the inequality of the ratios $\frac{x}{x_1}$ and $\frac{y}{y_1}$ is compensated. This possibility allows to use a pantograph with a ratio of gearing equal to 1:6, which is mostly in use with hand operated embroidering machines.

It is possible hereby to embroider by hand after disengaging the arm 7 from the nut 16, the point 9 becoming the fixed point of the pantograph.

It is advantageous that one of the components, the vertical in the described method of construction, is not transferred to the arm 7. By this reason the spindle 5 can be immovably supported in vertical direction and the pattern board remains available for hand embroidering.

The vertical component may be arranged on the pattern board 6 while the horizontal is connected to the point 9, and the direction of the components may be chosen at any inclined angle. In Fig. 2 I have shown such a modification in which the movement for the vertical component of a stitch is effected by the vertical screw 5ª and nut 8ª, while the horizontal component is effected by screw 11ª and nut 10ª. The screw 11ª is driven from the jacquard apparatus by shafts 19 and 20 and bevel gears 17 and 18, as shown.

I claim:

1. In automatic embroidering machines, two straight guides immovably arranged at an angle to each other, a pantograph, two points of the pantograph movable on said guides and forming components, a third point of the pantograph executing a resultant motion obtained by combining the two components, and a tambour frame connected to said third point, substantially as described.

2. In automatic embroidering machines, two straight guides immovably arranged at an angle to each other, means movable on said guides and forming components, links combined to form a square, one point of the links impelled by one of the components, an arm connected to one of the links impelled by the other component and a tambour frame operated by said links, substantially as described.

3. In a pantograph for automatic embroidering machines, a vertical spindle, a nut axially movable on said spindle, links combined to form a square, one point of the links connected to said nut, a horizontal spindle, a nut axially movable on said spindle, an arm connected to said second mentioned nut and square, and a tambour frame connected to the square and operated thereby in accordance with the resultant movements of the nuts.

4. In combination with a pantograph for embroidering machines composed of a frame whose members are pivoted together and having a tracer arm; means to automatically move the tracer arm rectilinearly and means to automatically move one of the pivot points of the pantograph frame rectilinearly, said rectilinear movements being rectangular to each other, and a member moved by the pantograph.

5. In combination with an embroidery frame and a pantograph for embroidering machines comprising four links pivoted together to form a rectangular frame, one of which links is extended into the tracer arm of the pantograph and another of which is extended for connection to the embroidery frame; means to automatically move a point on the tracer arm rectilinearly and similar automatic means to move a pivot point of the frame similarly at right angles to the movement of the tracer arm, thereby proportionately combining the two movements into a resultant movement at the point of connection of the pantograph with the embroidery frame.

In testimony that I claim the foregoing as my invention, I have signed my name in presence of two subscribing witnesses.

HIPPOLYT SAURER.

Witnesses:
 ERNST FISCHER,
 AUGUST RUEGG.

---

Copies of this patent may be obtained for five cents each, by addressing the "Commissioner of Patents, Washington, D. C."